United States Patent [19]

Jonnes

[11] 4,136,222
[45] Jan. 23, 1979

[54] THERMALLY INSULATING SHEET MATERIAL

[75] Inventor: Nelson Jonnes, Stillwater, Minn.

[73] Assignee: Minnesota Mining and Manufacturing Company, Saint Paul, Minn.

[21] Appl. No.: 788,150

[22] Filed: Apr. 18, 1977

[51] Int. Cl.² .................. B32B 3/24; B32B 3/26
[52] U.S. Cl. ................................ 428/116; 2/243 K; 2/272; 428/119; 428/138; 428/178; 428/286; 428/310; 428/332; 428/425; 428/457
[58] Field of Search ............... 428/73, 116, 119, 138, 428/245, 255, 286, 178, 71, 72, 320, 310, 332, 337, 457; 2/243 R, 272; 427/248 R, 250

[56] References Cited

U.S. PATENT DOCUMENTS

| | | | |
|---|---|---|---|
| 2,630,620 | 3/1953 | Rand | 2/243 R |
| 3,116,489 | 1/1964 | Weiss | 2/272 |
| 3,496,057 | 2/1970 | McCluer | 427/250 |
| 3,775,526 | 11/1973 | Gilmore | 428/116 |
| 4,032,681 | 6/1977 | Jonnes | 427/250 |

OTHER PUBLICATIONS

Modern Textile Magazine, "Clothing for Radiation Protection", vol. 45, p. 42, Feb. 1964.

Primary Examiner—George F. Lesmes
Assistant Examiner—P. Thibodeau
Attorney, Agent, or Firm—Cruzan Alexander; Donald M. Sell; Roger R. Tamte

[57] ABSTRACT

A new thermally insulating sheet material in which a thin drapeable specularly reflective sheet is supported in spaced relation from a thermally radiating surface by an array of resiliently flexible and compressible polymeric foam segments that cover only a portion of the area of the sheet.

14 Claims, 5 Drawing Figures

THERMALLY INSULATING SHEET MATERIAL

INTRODUCTION

To make outer garments sufficiently warm for many kinds of winter weather requires a bulky filling of the garments with insulation. For example, premium, down-filled parkas generally include a 20-to-40-millimeter-thick layer of down throughout the body and sleeves of the coat. Garments insulated with popular staple polyester fibers must be even thicker, on the order of 25 to 50 millimeters or more, to provide comparable warmth. The bulk and weight of the insulation in such garments limits the freedom of movement and comfort of persons wearing the garments.

The present invention provides a new insulating sheet material which exhibits high insulating values despite being thin and lightweight. This new insulating material makes use of the high reflectivity and low emissivity of a specularly reflective layer, and supports that layer in spaced relation from a thermally radiating surface, e.g. another wall of the sheet material or a wall of a garment in which the sheet material is incorporated.

Briefly, a thermally insulating sheet material of the invention comprises (1) at least one thin lightweight drapeable sheet carrying a vapor-deposited layer of specular reflective material on at least one surface; and (2) at least one separator layer between about one-fourth and one-and-one-half centimeters thick adhered to said sheet and comprising an open array of resiliently flexible, supple, and compressible polymeric foam segments. By "open," it is meant that there are spaces between the array of segments; the array is sufficiently open that it covers approximately 10 to 60 percent of the area of the specularly reflective sheet, and there is a maximum span of about 5 centimeters across an open area of the array. The foam segments are light in weight, having a density of less than about 0.5 gram/cubic centimeter. However, the separator layer exhibits a reduction in thickness of no more than about 50 percent under a static load of 7 grams/square centimeter, and exhibits a regain within an hour after brief compression at 70 grams/square centimeter of at least 90 percent.

PRIOR ART STATEMENT

The capability of a specularly reflective layer to reflect radiant energy, and the benefits to be realized from that capability in thermal insulation, are well recognized. However, prior to this invention, insofar as known, no one had used that capability to provide a thermal insulation that is practical and suitable for garments.

One example of prior work is found in an article entitled "Clothing for Radiation Protection," by Thomas J. Seery, in Modern Textile Magazine, volume 45, page 42 (February, 1964), which describes an experimental winter garment intended to provide both warmth and protection against thermal radiation from a nuclear weapon. In this garment,

[t]he aluminized sides of two fabrics were faced in toward one another, but separated by a corrugated interlining, an open mesh, screen-type fabric made of plastic yarns. The two aluminum surfaces then could "see" each other through the open mesh. The corrugated surface of the interlining minimized contact with the metal and maintained an air space for additional insulation.

Such a structure could not be a satisfactory commercial insulation for garments. A corrugated screen-type fabric of sufficient thickness to separate the aluminized fabrics would necessarily limit the drape, flexibility, and feel of a garment beyond a level that would be acceptable by garment wearers. A successful garment insulation must balance resistance to compression with conformability, softness, and resilience; and the described structure would appear inadequate to achieve such a combination of properties. Further, the aluminized fabrics in the structure were apparently free to separate and slide with respect to one another, such that large gaps or openings could develop between the fabrics in an irregular manner.

Applicant's product avoids such deficiencies by use of a novel separator layer. This separator layer provides a uniform pattern of support between two sheets; exhibits a desired balance between resistance to compression and the softness needed for comfortable wearing; will flex in all directions; and is supple and drapeable so as to permit freedom of movement by persons wearing a garment that incorporates the sheet material. Despite providing needed support, the separator layer leaves a large percentage of the specularly reflective layer uncovered, which maximizes the heat-reflecting value of the reflective layer.

Nongarment thermal insulation has also incorporated specularly reflecting layers. Rigid panels useful as thermally insulating structural elements in various buildings, compartments, and containers have included specularly reflective layers held in spaced relation from one another. In Jones, U.S. Pat. No. 3,616,139, rigid panels are prepared by gluing honeycomb layers between metallized sheets, and the honeycomb may or may not be filled with fibrous material. Steck, U.S. Pat. No. 3,041,219 teaches a wall board that comprises a corrugated fiber board and flat sheets of fiber board covered with perforated metal foil and adhered to each side of the corrugated board. Matsch, U.S. Pat. No. 3,007,596, teaches a flexible insulating sheet material for portable or larger containers and comprising several layers of aluminum foil held in spaced relation by layers of fiberglass with a vacuum drawn between the layers. Hnilicka, U.S. Pat. No. 3,018,016, teaches an insulation for use in an evacuated double-wall container comprising several sheets of metal-coated organic plastic sheets crinkled to cause only point contact between adjacent layers. Other nongarment thermal insulation structures incorporating specularly reflective layers are taught in Notaro, U.S. Pat. No. 3,647,606, and Voelker, U.S. Pat. No. 3,249,659.

However, none of these materials would be useful as thermal insulation for garments. Most are rigid structures without the supple flexibility needed to provide proper comfort and drape in garments. Further, use of a vacuum in a commercial widely useable garment insulation is impractical, and use of a fibrous spacer between reflective layers takes away much of the function of the specularly reflective layer. None of the cited patents discusses a need for spacing of the kind used in the present invention or provides spacing means that provides the combination of openness; resistance to compression; flexibility and suppleness; and stability in shape and size provided by my invention.

DETAILED DESCRIPTION

Figure 1:
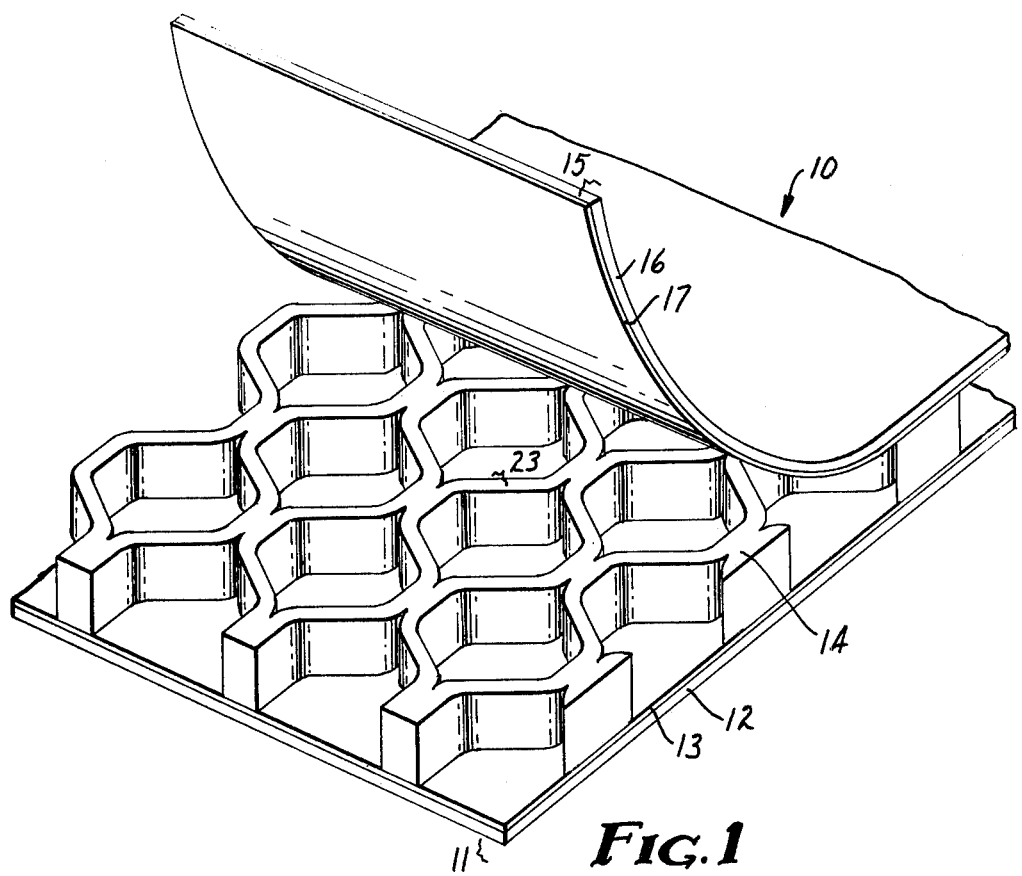
FIG. 1 is a perspective view of a portion of thermally insulating sheet material of the invention.
Figure 2:
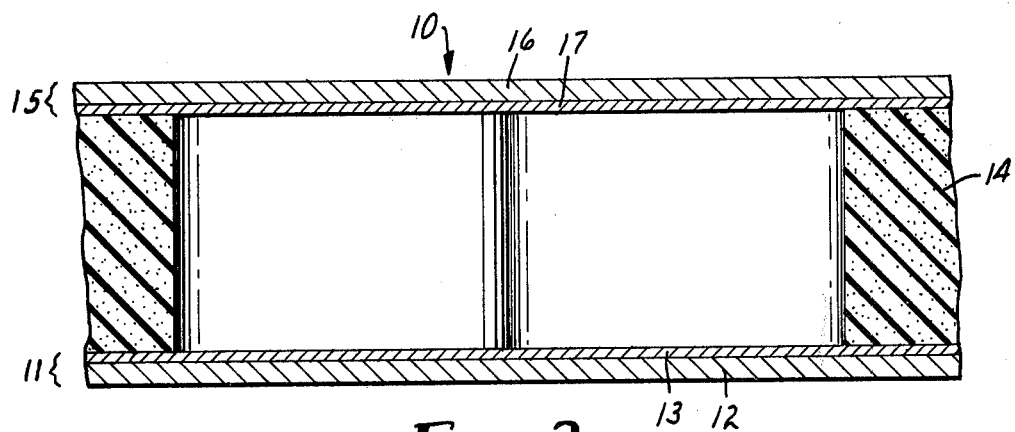
FIG. 2 is an enlarged sectional view through a portion of a thermally insulating sheet material of the invention.

FIGS. 1 and 2 show a representative sheet material of the invention 10. The sheet material 10 comprises a first specularly reflective sheet 11, which itself comprises a base sheet 12 and a specularly reflective layer 13; a separator layer 14 adhered to the first specularly reflective sheet and comprising an array of polymeric foam segments, which in this case comprise a connected network of polymeric foam; and a second specularly reflective sheet 15 comprising a base sheet 16 and a specularly reflective layer 17.

The specularly reflective sheet or sheets used in thermal insulation of the invention should be thin, lightweight, and substantially as flexible and drapeable as fabric conventionally used in outer garments. In general, the specularly reflective sheet is sufficiently drapeable so that when a piece one meter square is laid over a person's fist, the sheet will collapse down so that portions of it engage the wrist of the person. Drapeability as described can be obtained with drapeable base sheets that carry very thin reflective layers such as obtained by vapor-deposition of the reflective material. Such thin reflective layers provide good reflective properties, are sufficiently durable and strong, and leave the base sheet on which they are carried with essentially their original drapeability, flexibility, and hand. Generally the reflective layer is less than 1 micrometer in thickness and preferably is less than 1000 angstroms in thickness.

A variety of fabrics of films are useful as the base sheet on which the specularly reflective layer is carried. A preferred commercially available base sheet material is an open or porous polyethylene film (such as "Delnet" P-520 supplied by Hercules), which is understood to be made by embossing a film with a network of ribs and then stretching the film to rupture it at the spaces between the ribs (see U.S. Pat. Nos. 3,137,746; 3,441,638; and 3,922,329). Other useful base sheets are woven, nonwoven, or knit fabrics of synthetic or natural fibers.

The specularly reflective material may be vapor-deposited directly on a base fabric or film, or a specularly reflective layer can be formed on a transfer liner and then transferred to the base sheet and adhered there with a layer of adhesive (see Keithly, U.S. Pat. No. 2,703,772). Some practical materials for the reflective layer are aluminum, copper, and alloys of copper; other metals or materials which reflect substantial portions of incident thermal radiation may also be used. Preferably, the specularly reflective sheet carries a specularly reflective layer on both sides to maximize reflectivity and minimize emmissivity or radiation from the sheet.

Though nonporous specularly reflective sheets are useful, preferably the reflective sheet is porous in order to give the insulating sheet material of the invention breathability. Preferably, a specularly reflecting sheet used in the invention exhibits a porosity of at least 1, and more preferably at least 10, cubic centimeters per square centimeter per second at a pressure of one gram per square centimeter pressure. Porosity can be measured by apparatus and methods taught in a copending application, Ser. No. 569,795 filed Apr. 12, 1975, now issued as U.S. Pat. No. 4,032,681, which is incorporated hereby be reference (the method is summarized in footnote (1). A useful method for preparing porous reflective fabrics taught in that patent includes the steps of:

(1) applying a layer of adhesive material onto a thin smooth continuous reflective layer that is carried on a smooth flexible web;

(2) laminating to the adhesive layer a base fabric that is resiliently stretchable at least 10 percent without tearing;

(3) removing the smooth flexible web from the reflective layer; and (4) stretching the resulting sheet material so as to form an extensive network of minute fractures in the reflective and adhesive layers that communicate with interstices of the fabric.

To give adequate effect to the specularly reflective layer or layers in sheet material of the invention the separator layer should be open over at least 40 percent of its area; or as stated conversely above, the separator layer should cover no more that about 60 percent of the area of the specularly reflective sheet. Preferably the separator layer covers no more than 40 percent of the area of the reflective sheet. On the other hand, to assure needed support between the specularly reflective sheet and an opposed sheet, the separator layer should cover no less than about 10 percent, and preferably no less than about 20 percent, of the specularly reflective layer. To further contribute resistance to compression and maintainence of spacing, even in areas subject to localized compression, the maximum span across an open area of the separator layer should be no more than about 5 centimeters and preferably no more than about 3 centimeters. The separator layer should be reduced in thickness by no more than 50 percent (i.e. a one-centimeter-thick layer compresses to no less than 0.5 centimeter), and preferably no more than 20 percent under a static load of 7 grams/square centimeter (0.1 pound/square inch).

As indicated above, a material adapted to provide the needed combination of properties to be exhibited by the separator layer is a resiliently compressible polymeric foam. Polyurethane foams are readily available and well adapted to use in the invention. Other useful polymeric foams are neoprene and nitrile rubber foams.

Figure 4:
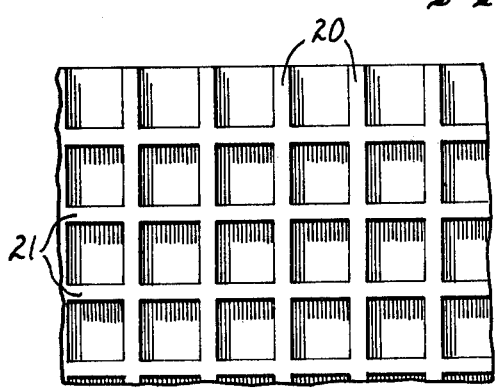
FIGS. 3 and 4 are plan views of fragments of different separator layers used in sheet materials of the invention.
Figure 3:
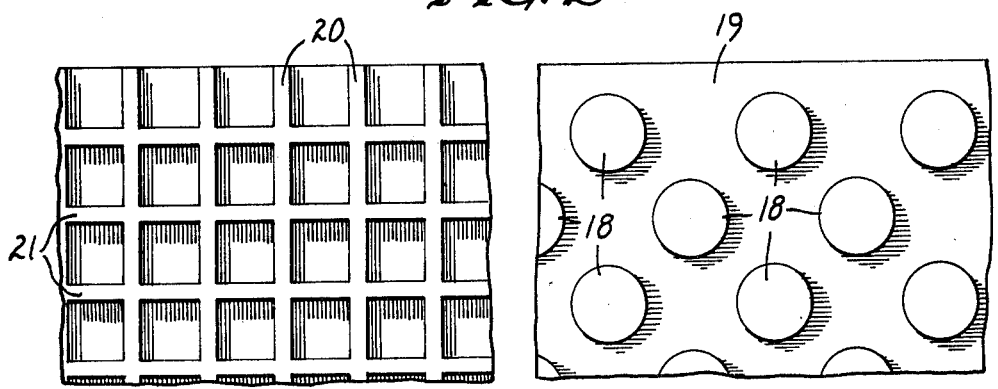

A separator layer may be molded in the expanded network shown in FIG. 1, or a continuous sheet of material may be cut and then expanded to the shape shown. Other useful shapes are the spaced nonconnected pillars 18 shown adhered to a base sheet 19 in FIG. 3; or the parallel ribs 20 shown in FIG. 4, which may or may not be connected by transverse segments 21.

A complete sheet material of the invention, in which a separator layer is combined with a drapeable specularly reflective sheet, is sufficiently flexible and conformable so that, for example, it can be readily wound upon a mandrel one centimeter in diameter. The flexibility is enhanced by the open nature of the separator layer. Greatest flexibility is achieved when the average width of the polymeric foam segments, i.e. the dimension 23 in FIG. 1, is no more than about 5 millimeters, and when the array of polymeric foam segments covers a low percentage of the area of the specularly reflective sheet, such as 10 to 30 percent.

The separator layer should be adhered to the specularly reflective sheet so as to provide stability to the sheet material in a completed garment. Preferably a thin layer of adhesive is applied between the separator layer and the specularly reflective layer. In incorporating sheet material of the invention into a garment a second sheet is laid over the exposed or unadhered surface of the separator layer. This second sheet may or may not be specularly reflective, and may or may not be adhered or attached to the foam; when it is not attached, the greatest freedom in movement and suppleness is provided to the insulation in a garment. Alternatively to adding a second sheet in a garment, sheet material of the invention may itself be supplied with a second sheet, either specularly reflective or not, attached to the separator layer.

Figure 5:
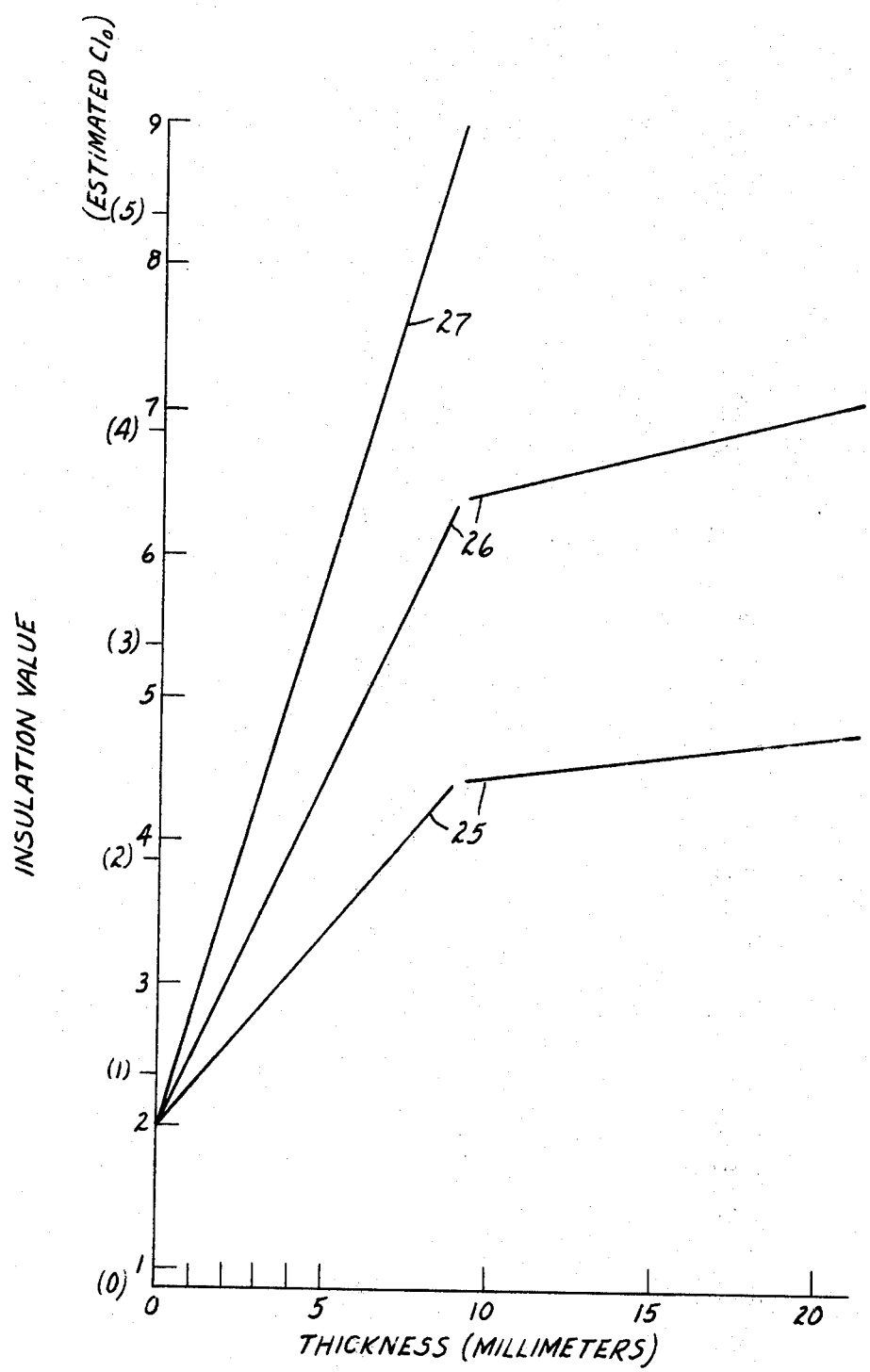
FIG. 5 is a graph of experimental results obtained with sheet material of the invention.

Different insulation values are obtained with different thicknesses of separator layer. FIG. 5 is a graph of experimentally measured insulating values of thermally insulating sheet materials of the invention having different thicknesses (the construction of the tested sheet material and the test method are described in footnote 2). Curve 25 shows the insulating values of different thicknesses of a single-ply sheet material of the invention (one separator layer attached to one specularly reflective sheet); curve 26 shows the variation in insulating value of double-ply sheet material (a sandwich of two identical single-ply sheet materials, each comprising a separator layer attached to a specularly reflective sheet) according to the thickness of the single-ply sheet material; and curve 27 shows the variation in insulating value of a triple-ply sheet material according to the thickness of a single ply.

The curves show that a single layer of sheet material of the invention should be at least one-fourth centimeter thick and preferably at least one-half centimeter thick. Ideal results appear to be obtained in a thickness range of 6 to 8 millimeters; generally the insulating value gained by adding thickness beyond 10 or 12 millimeters is insufficient to justify the bulk added to a garment. As the curves demonstrate, the best way to maximize insulation in a garment with sheet material of the invention while maintaining the thinness that contributes to comfortable garments is to stack several pieces of sheet material of the invention one over another to provide a composite insulation. Desirably in such stacked products the individual layers are from the lower range of thicknesses, i.e. 1 centimeter or less. In another construction separator layers are adhered to each side of a single specularly reflective sheet, which preferably is specularly reflective on both its surfaces. Such a sheet material can then be incorporated into a garment sandwiched between inner and outer shells of fabric.

The insulation value of a single-ply sheet material of the invention having an 8-millimeter-thick, 70-percent-open separator layer and one specularly reflective layer provides in the range of 2.1 clo when enclosed within an inner and outer garment-"shell" fabric.[3] Such an insulation is suitable for a broad range of winter garments worn for protection against 15° F. to 50° F. winter weather. For more extreme conditions, additional insulation is obtained by use of two units or plies of such a sheet material of the invention, making an overall thickness of 16 millimeters and an insulation value of about 3.3 clo. This amount of insulation is adequate for most severe winter conditions. It has the advantage of being as warm as 25 millimeters of polyester staple fiber insulation, while being significantly lighter in weight and more flexible.

FOOTNOTES (1) The test apparatus includes an open-topped container almost filled with water; an open-bottomed plastic bottle; and a cap for the bottle, which has a central opening. A sample of test fabric is placed inside the bottle cap and the bottle placed on top of the water and allowed to sink. The bottle sinks freely, with the air inside the bottle escaping only through the test fabric. Porosity of the fabric can be determined from a measurement of the time for the bottle to be filled with water, the result being in units of volume per unit of time (the volume of the bottle divided by the measured time) per unit of area (the area of the opening in the cap) at a specified unit of pressure (the weight of the bottle divided by the area of the open end of the bottle).

(2) Different test samples were prepared with polyurethane foam (density of 0.025 gram/cubic centimeter) of different thicknesses, specifically 3, 4, 5, 6, 8, 10, 15, and 20 millimeters. Adhesive was laminated to each sample, after which they were cut and expanded so as to create a network of cells, each cell being approximately square, 18 to 20 millimeters across and 25 millimeters on the diagonal. The cell wall thickness averaged about 3 millimeters. The percent open area was 68 to 70 percent. The expanded foam was then hot laminated to an open film of polyethylene ("Delnet" P-520) that had been vapor-coated with aluminum.

The thermal test apparatus consists of an aluminum can 20 by 36 by 3 centimeters filled with 2270 grams of water. A thermistor is taped to the center of each can. The insulation sample is used to prepare a complete covering for the can. Each sample tested is incorporated into a composite test fabric consisting of a thin lightweight nylon taffeta inner shell, the experimental insulation sample, and a heavier, tight-weave (but not coated) nylon outer shell. All edges are stapled or sewn and then sealed with tape to prevent wind leaks. Test cans are left in an oven overnight to reach about 40° C., and then hung from a frame about 10 to 15 centimeters apart in an Arctic room at −18° C. with a fan blowing on them. The frame is rotated 180° every 3 minutes to prevent colder water settling in the cans and causing error. Temperatures are read on the cans after 6 minutes, and every 3 minutes thereafter, using a Yellow Springs Instruments' temperature readout device (accurate to about 0.2° C.). The first two readings are ignored so that the heat loss rate has between 6 and 12 minutes to stabilize. Then, 5 or 6 more readings are taken, over a 15-to-18-minute period. These time-temperature values are then used to determine a temperature loss rate in degrees centigrade per minute. Because the loss rate is inversely proportional to the insulation, the reciprocal of the loss rate may be used as a simple, direct statement of insulation value. This insulation value is given in FIG. 5.

Thickness of insulation was measured on the test can. After the thermal test was completed, a needle was stuck through the insulation to the can and the outer shell aligned to its level prior to entry of the needle. A felt tip pen mark was made on the needle and the depth measured. Six points were measured for each can and an average taken.

(3) The clo is a unit of thermal resistance defined as the amount of thermal resistance provided by an arbitrarily selected standard set of clothing. It is defined mathematically as:

$$1 \, clo = \frac{(0.18° \, C) \, (meter)^2 \, (hour)}{(kilo \, calories)}$$

Values of thermal resistance reported in the specification in clo have been measured or estimated by correlating measurements on test apparatus as described in footnote 2 above with measurements made by an independent outside agency on a guarded hot plate in the manner described in ASTM S1518-64.

What is claimed is:
1. A sheet material useful as thermal insulation in garments and the like comprising
(1) at least one thin lightweight drapeable sheet carrying a vapor-deposited layer of specularly reflective material on at least one surface; and
(2) at least one separator layer between about one-fourth and one-and-one-half centimeters thick adhered to said sheet and comprising an open array of resiliently flexible supple and compressible polymeric foam segments having a density less than about 0.5 gram/cubic centimeter, said array of segments covering between about 10 and 60 percent of the area of said sheet and having a maximum span across an open area of the array of no more than about 5 centimeters, and said separator layer exhibiting a reduction in thickness of no more than about 50 percent under a static load of 7 grams/square centimeter and a regain after brief compression at 70 grams/square centimeter of at least about 90 percent.

2. Sheet material of claim 1 in which said sheet has a porosity of at least about 1 cubic centimeter per square centimeter per second under a pressure of one gram per square centimeter.

3. Sheet material of claim 1 in which said separator layer is between about one-half and one centimeter in thickness.

4. Sheet material of claim 1 which includes a second thin drapeable lightweight sheet carrying a vapor-deposited layer of specular reflective material and attached to the side of said separator layer opposite from the first sheet.

5. Sheet material of claim 1 in which said array of segments comprises a sheet of said polymeric foam cut and expanded to an open network.

6. Sheet material of claim 1 in which said separator layer covers between about 10 and 30 percent of the area of said sheet.

7. Sheet material of claim 1 in which the average width of a foam segment is no more than about 5 millimeters.

8. Sheet material of claim 1 in which a separator layer as described is adhered to each side of said sheet.

9. Sheet material of claim 8 in which each side of said sheet carries a vapor-deposited layer of specularly reflective material.

10. A sheet material useful as thermal insulation in garments and the like comprising
    (1) at least one thin lightweight drapeable sheet carrying a vapor-deposited layer of specularly reflective material on at least one surface; and
    (2) at least one separator layer between about one-half and one centimeter thick adhered to a side of said sheet and comprising an open array of resiliently flexible supple and compressible polymeric foam segments having a density less than about 0.5 gram/cubic centimeter and averaging less than about 5 millimeters in width, said array of segments covering between about 10 and 30 percent of the area of said sheet and having a maximum span across an open area of the array of no more than about 3 centimeters, and said separator layer exhibiting a reduction in thickness of no more than about 50 percent under a static load of 7 gram/square centimeter and a regain after brief compression at 70 grams/square centimeter of at least about 90 percent.

11. Sheet material of claim 10 in which said sheet has a porosity of at least about 10 cubic centimeter per square centimeter per second under a pressure of one gram per square centimeter.

12. Sheet material of claim 10 in which said array of segments comprises a sheet of said polymeric foam cut and expanded to an open network.

13. Sheet material of claim 10 in which a separator layer as described is adhered to each side of said sheet.

14. Sheet material of claim 13 in which each side of said sheet carries a vapor-deposited layer of specularly reflective material.

* * * * *